United States Patent Office 3,652,497
Patented Mar. 28, 1972

3,652,497
POLYMERIC THICKENERS AND METHOD OF PREPARING SAME
Thomas B. Junas, Arlington, and Augustin La Torre, Burlington, Mass., assignors to General Latex and Chemical Corporation, Cambridge, Mass.
No Drawing. Filed Apr. 20, 1970, Ser. No. 30,285
Int. Cl. C08f 15/36, 19/00
U.S. Cl. 260—47 UA                             18 Claims

ABSTRACT OF THE DISCLOSURE

A polymeric surfactant thickener comprising a copolymer of an ester of an alkylarylpolyether alcohol, such as an alkylphenoxypolyethyleneoxyethanol, with an unsaturated carboxylic acid compound, such as acrylic or methacrylic acid, and an unsaturated acid compound, which copolymer comprises from about 70 to 95% of the ester and from about 5 to 30% of the unsaturated carboxylic acid, and which copolymer contains from about 20 to 100 oxyethylene groups. The polymeric surfactant thickener is particularly useful in thickening polymeric latex compositions, such as carboxylated styrene-butadiene latex containing filler material.

BACKGROUND OF THE INVENTION

Compounds known as thickeners are commonly employed in a variety of compositions to provide thickening effects, such as in polymeric latex compositions, such as natural and synthetic elastomeric latex compositions, which contain a particulate filler material. Such thickeners are employed to control the viscosity of the compositions. In addition, surfactants and dispersant compounds are also employed in a variety of compositions, particularly polymeric latex compositions, which surfactants and dispersants are incorporated to aid in dispersing the filler materials employed in such compositions. Typically, more than one type or kind of a surfactant or thickener must be employed, since a single thickener or surfactant often fails to give a uniform thickness or adequate control of viscosity over the viscosity range desired. Further, it is known that compounds which are used as thickeners are often, themselves, high viscosity materials which are difficult to incorporate into low viscosity materials, such as a low viscosity latex, without at least initial dilution of the thickener material.

In general, an effective thickener material should be used in a minimum quantity and should not affect the basic properties of the latex or other compositions in which the thickener is to be employed. Thickeners may be broken down into two general classes, nonpolar and polar. The nonpolar class of materials comprises those materials which function primarily through the mechanism of hydrogen bonding to obtain thickening effects. Polar thickeners function primarily due to adsorption of the thickener materials on the particles of the composition; for example, the filler materials or the polymeric dispersant particles.

Water-soluble materials employed as thickeners include natural gums and resins, such as starch, gum arabic, modified starch products, dextrins, sodium algiinates, gums, such as tragacanths and other such compounds. Synthetic materials employed as thickeners include carboxymethylcellulose, polyvinyl alcohol, polyacrylamide, polyacrylic acids and salts thereof, methylcellulose and other cellulose derivatives such as carboxymethylcellulose and hydroxyethylcellulose; polyvinylpyrrolidone, polyvinylmethylether, polyethyleneoxides and copolymers of polyvinylmethylether and maleic anhydride. Thickeners of the polyelectrolyte type function primarily due to adsorption and include synthetic polymeric water-soluble thickeners such as the sodium polyacrylates as well as the copolymers of various acrylates, such acrylic thickeners being described more particularly in U.S. Pats. 2,883,351; 2,956,046; 3,035,004; and 3,436,378.

Water-soluble polyelectrolyte copolymers employed as thickeners include those esters prepared by the esterification reaction between the acid anhydride groups of a tion reaction between the acid anhydride groups of a copolymer of an alkylvinylether and maleic anhydride with the terminal hydroxyl groups of a nonionic surfactant of an alkylphenoxyethoxyethanol polymer. The resulting water-solution polymer is a partial ester which contains free acid anhydride groups suitable for subsequent neutralization with a basic material, such as an amine or a metal oxide or hydroxide. The water-soluble polymeric esterification materials are employed as emulsion stabilizers, thickeners and film formers. The preparation of such water-soluble polymeric materials occurs in the reaction between two polymeric molecules while the resulting polymer from such reaction does not contain any unsaturated linkage therein which would permit further polymerizations or reactions other than through the free acid anhydride groups fo the polymer. Interpolymers prepared by the reaction of maleic anhydride with vinyl monomers, which interpolymers are useful as thickeners, are described in U.S. Pat. 3,499,876, issued as thickeners, are described in U.S. Pat. 3,499,876, isued Mar. 10, 1970, the disclosure of which is hereby incorporated by reference.

SUMMARY OF THE INVENTION

Our invention concerns a novel class of water-soluble unsaturated monomeric esters of alkylarylpolyether alcohol, copolymers of such ester monomers, the method of preparing such esters and copolymers and latex compositions containing such copolymers as materials to control the viscosity of such latex either alone or with other thickeners, surfactants or film-forming materials. In particular, our invention relates to a novel class of water-soluble monomeric short-chain unsaturated carboxylic acid esters of alkylphenoxypolyethyleneoxyethanol useful as surfactants and to water-soluble copolymers of an alpha beta unsaturated carboxylic acid, such as an acrylic or methacrylic acid with such esters as thickener materials suitable for use in thickening polymeric latex compositions. Our polymeric thickener materials are particularly suitable for use when incorporated into polyelectrolyte-type polymeric latex compositions such as in carboxylated synthetic latex compositions such as carboxylated styrene-butadiene latex.

Our polymeric thickener material is characterized by containing a long-chain polymeric backbone which contains from about 20 to 100 or more repeating alkyleneoxy groups, such as from about 50 to 100 ethyleneoxy groups. Typically, our polymeric thickener comprises from about 70 to 95% by weight of an unsaturated carboxylic acid or acid salt with from about 5 to 30% by weight of the ester or acid reaction product resulting from the reaction of an unsaturated acid with the terminal hydroxy groups of a long-chain nonionic surfactant polyether alcohol. Our polymeric thickeners are prepared by reacting an alkylarylpolyether alcohol, such as an alkylphenoxypolyethyleneoxyethanol or alkylphenoxypolypropyleneoxypropanol, with a short-chain alpha beta unsaturated acid or acid salt to form an acid reaction product which contains the ester of the corresponding alcohol. The ester material obtained may be usefully employed as a polyelectrolyte-type surfactant. The monomeric water-soluble ester is then copolymerized with an alpha beta unsaturated acid to form a water-soluble polymeric thickener material containing acid groups. Where desired, the polymeric thickener material may then be reacted with basic materials to form the corresponding salt of the polymeric thickener material.

Our polymeric materials, especially in the form of their water-soluble derivatives, such as their salts or their partial ester salts, exhibit unique and useful effects in aqueous solutions, particularly in thickening polymeric latex compositions such as the carboxylic latex compositions. Our polymeric thickeners may be added in minor amounts alone or in combination with other known thicknemers or additives particularly to aid in the dispersion of polymeric latex compositions which may contain finely divided solid particulate materials, such as fillers, pigments and the like. Our polymeric thickeners in amounts of from about 0.05 to 5.0% by weight, but often in amounts from 0.1 to 2.0% by weight will significantly increase the viscosity of a polymeric latex and will impart excellent flow properties to such latex of other compounds into which the material is incorporated. Our thickeners will, in addition, find utility as gelling or thickening agents, dispersants and film-forming agents in a wide variety of aqueous, aqueous-alcohol and other solutions. Our polymeric materials may be readily mixed with and dispersed in aqueous solutions such as polymeric latex compositions of low viscosities to provide an increase in viscosity coupled with rapid dispersability of the thickener material. Our polymeric thickener materials exhibit excellent viscosity and flow properties in themselves, thereby permitting their ready mixing into aqueous solutions and dispersions often without dilution.

The alcohols useful in preparing our polymeric thickener materials and which represent the backbone of the resulting polymer chain are those nonionic surfactants including long-chain alkylarylpolyether alcohols, such as alkylphenoxypolyalkyleneoxyalkanols, such as, for example, the $C_6$–$C_{20}$ alkylphenoxy(poly $C_2$–$C_3$ alkyleneoxy) $C_2$–$C_3$ alkanols. Typical and representative alcohols which may be employed include those alkylphenoxypolyethyleneoxyethanols and alkylphenoxypolypropyleneoxypropanols or mixtures thereof, particularly those compounds wherein the ethyleneoxy groups range from about 20 to 100 average units or more, preferably those from about 40 to 100 units. We have found that the length of the alkyleneoxy groups is important to the thickening properties of my polymeric thickener materials in that those polymers having only a small number of the alkyleneoxy groups, such as generally less than about 10, exhibit reduced thickening properties compared to those compounds having about 20 units or more. The alkylphenoxypolyethyleneoxyethanol may be prepared by the reaction of the appropriate alkyl phenol with ethylene oxide. Representative examples of such materials include, but are not limited to, heptylphenoxypolyethoxyethanols, octylphenoxypolyethoxyethanols, methyloctylphenoxypolyethoxyethanol, nonylphenoxypolyethoxyethanols, dodecylphenoxypolyethoxyethanols.

The unsaturated acid compounds useful in preparing the acid alcohol reaction products; that is, the esters of our invention, as well as preparing the preferred copolymeric thickener materials of our invention include, but are not limited to, those alpha beta short-chain $C_2$–$C_6$ unsaturated acids and acid anhydrides which may contain 1,2,3 or a number of carboxylic acid or anhydride groups or the salts thereof, such as acrylic acid, methacrylic acid, itaconic acid, maleic acid, fumaric acid and the substituted derivatives of such unsaturated acids such as the $C_1$–$C_6$ alkyl-substituted derivatives thereof like vinyl acrylic acid, phenyl acrylic acid, propyl, butyl, hexyl acrylic acid and the like. The methacrylic and acrylic acids and their salts and derivaties which, during the reaction generate or form such acids, represent the preferred acids both for reacting with the alcohols and for preparing the polymeric thickeners.

The alcohol and the acid are reacted under anhydrous or substantially anhydrous conditions to effect the esterification of the alcohol through reaction between the acid groups and the terminal hydroxy groups of the alcohol. Typically the alcohol is heated to a temperature of 40 to 80° C. sufficient to melt the alcohol where it is a solid and the unsaturated acid then added. The reaction is carried out in the presence of an acid catayst, such as paratoluene sulfonic acid and also in the presence of a small but inhibiting amount of an inhibiting agent, such as a phenol compound like paramethoxy phenol. The inhibiting agent is employed to prevent or inhibit the copolymerization of the unsaturated acid employed in the acid alcohol reaction. The reaction mixture is stirred and then heated to a temperature sufficient to drive off the water of esterification, for example, 100 to 150° C. and to form the resulting monomeric ester product. The reaction may be carried out in contact with the air in order to also inhibit the polymerization of the unsaturated acid used as well as the empolyment of a monomer inhibitor.

We have found that our copolymer is preferably prepared by a method of incremenal addition, whereby a portion of the ester is introduced at the start of the copolymerization reaction and the remainder of the ester introduced incrementally during the polymerization reaction exotherm. Our incremental method does not change the quantity of the surfactant after use, but improves the shelf stability of the latex compositions compounded with the resulting thickner. Such latex compositions show less of a tendency to produce syneresis and exhibit better fluidity properties.

Our preferred method comprises intimately mixing all of the unsaturated acid compounds in a water solution with from about 20 to 60% of the ester; e.g., 40–55%. We have found that less than about 20% tends to produce poor thickening properties, while more than 60% tends to give gellation of the copolymer around the stirrer. The solution is then heated to a temperature of about 35 to 45° C.; e.g., 37–38° C., or to a temperature sufficient to provide thermalequilibrium of the solution while agitating the solution. Thereafter, a redox catalyst system is introduced and incorporated into solution at such temperatures to induce the polymerization reaction and the resulting reaction exotherm. At regular intervals of the exotherm rise, incremental additions of the remaining ester are introduced into the reaction mixture until the exotherm peak temperature of about 160 to 170° F. is reached. The solution is then maintained for a period of time at the exothermic peak temperature and then cooled to approximately 130° F. and thereafter neutralized. Our preferred procedure avoids the problems associated with premature gelling of the copolymerization reaction product and promotes efficient utilization of the reactants and inhibits loss of the resulting polymer product due to gellation. Typically, the incremental additions of the ester may be added at 3,4,5 or more different exothermic temperatures; for example, at 43–44° C., 48–50° C., 54–55° C. and 60–62° C. Our preferred technique provides a homogenous copolymer thickener product.

In the acid alcohol reaction, only a minor portion of the alcohol surfactant is esterified with the resulting acid alcohol reaction mixture comprising, for example, less than 20% of an ester and containing a free polymerized unsaturated acid ester. The ester prepared may be usefully employed per se as an anionic-nonionic-type surfactant.

In addition to the ester formation, the other reaction products are not identified, but are believed to be (a) a surfactant-ester acrylic acid graft, (b) a surfactant-acrylic acid graft, (c) a polyacrylic acid, or (d) a combination of (a), (b), (c) and the surfactant ester itself. The following structural formula represents the acrylated ester monomer:

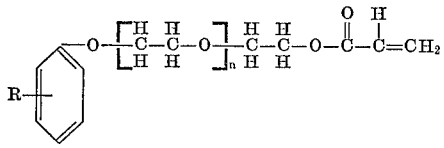

ALKYLPHENOXYETHYLENEOXYETHYL ACRYLATE

The formula represents the ester prepared by the reaction of an alkylphenoxypolyethoxyethanol with acrylic acid wherein an R may represent one or more alkyl or alkylene or other aliphatic substituent radicals on the phenyl group and $n$ is 20 to 100.

The water-soluble monomeric ester from the acid alcohol reaction is copolymerized with an unsaturated acid or acid anhydride wherein copolymerization to form the water-soluble polymeric thickener of our invention occurs primarily through the unsaturated groups, both in the surfactant ester and the acid. The resulting polymeric material then contains free acid groups for neutralization or pH adjustment where desired. It is also recognized that the subsequent copolymerization may also occur between the monomeric unsaturated ester and with a nonacid unsaturated monomer. However, the resulting copolymer produced will not then contain free acid groups. However, where desired, a mixture of both unsaturated acids and unsaturated nonacid monomers may be employed to prepare a polymeric material.

Some unsaturated monomeric materials which may be employed in the copolymerization reaction where desired would include any number of monomeric materials, preferably those water-soluble or alcohol water-soluble monomers containing carboxylic or sulfonic acid, hydroxyl, amino or other polar groups. Typical materials include alkyl esters of acrylic acid or methacrylic acid, such as methyl acrylate, ethyl acrylate, butyl acrylate, isobutyl acrylate, 2-ethylhexyl acrylate, methyl methacrylate. Hydroxyethyl methacrylate and hydroxypropyl methacrylate as well as amino acrylates such as dimethylamino and tertiarybutylamino acrylates may be employed where it is desired to introduce hydroxyl or amino groups.

In one preferred embodiment of our invention, the unsaturated acid monomeric materials or similar materials as employed in the acid alcohol esterification reaction are then employed in the copolymerization reaction with the preferred materials being methacrylic and acrylic acid.

The copolymerization reaction is carried out in a water solution of the monomeric compounds in the presence of a reduction-oxidation catalyst or other polymerization catalyst or initiator system. A suitable redox catalyst system would include a persulfate and sulfite and in the presence or small amounts of an electron carrier to facilitate the formation of free radicals, such as ferrous sulfate. The reaction materials may be added incrementally in order to prevent premature gelling and difficulties with agitation of the resulting copolymer. The polymerization reaction is exothermic and usually proceeds at a temperature of from 40 to 90° C.; for example, 40 to 80° C.

The resultant water-soluble polymeric materials of the copolymerization reaction in the preferred embodiment contains free acid groups. The pH of the copolymerization reaction mixture after polymerization is typically from about 2.0 to 3.0. Where desired, the pH of the water-soluble polymeric material may be then adjusted through the use of basic materials to the polymeric material or the solution thereof or the polymeric solution may be employed directly, such as in an alkaline latex polymeric composition wherein the alkaline material used in the latex alone or with other basic materials will increase the pH to a desired predetermined level. Typically and preferably, adjustment to a pH of 6.0 to 8.0, 7.0 to 7.5 is accomplished through neutralization of the pendant acid groups of the polymeric material by a strong water-soluble base, such as an amine or a metal oxide or hydroxide such as an alkali or an alkaline earth hydroxide such as sodium hydroxide, calcium hydroxide, barium hydroxide, potassium hydroxide, lithium hydroxide, ammonium hydroxide and the like. Of course, neutralization may also be accomplished by esterification or neutralization of all or part of the pendant acid groups through reacting such groups with alcohol or amine or other acid reacting materials. Where the polymeric material includes nonacid ester groupings, these ester groupings may be hydrolyzed on the neutralization of the pendant acid groups in the polymer.

Our thickeners are characterized in having a viscosity of approximately 30 to 90,000 centipoises and wherein the polymer typically contains less than 15% of ester groupings; for example, 8 to 12% ester groupings and an acid number of from 35 to 40. The copolymers of our invention as well as their neutralization products may be employed as dispersants, thickeners, film formers and as surfactants for controlling the viscosity of water solutions or dispersions, such as of water-insoluble polymers of natural and synthetic of a variety of type. The ability of our polymers to thicken such polymers will be shown for illustrative purposes only in the connection with a carboxylated styrene-butadiene synthetic rubber latex. However, other aqueous dispersions, emulsions, suspensions, solutions, slurries and the like may be thickened by our thickeners including those latex compositions containing polymers and copolymers of acrylonitrile with a diene like isoprene, butadiene or chloroprene, homopolymers of styrene, copolymers of vinyl halide resins like vinyl chloride, vinylidene chloride, acrylonitrile or vinyl esters such as vinyl acetate, vinyl acetate homopolymers and copolymers, copolymers of styrene and unsaturated acid anhydrides like maleic anhydrides, homopolymers and copolymers of acrylic and methacrylic acid and their esters and derivatives, polybutadiene, polyisoprene, butyl rubber, natural rubber, ethylenepropylene copolymers, olefinic resins like polyethylene, polypropylene, polyvinyl alcohol, carboxylated natural and synthetic latices and similar polymeric materials.

Our polymeric thickeners are particularly applicable in the control of viscosity of thickening of carboxylic latex compositions which typically have been difficult to thicken with conventional thickening material. The latex compositions to be thickened by our polymeric materials may also include finely divided particulate matter in the form of fillers, pigments such as fine fillers and the like such as zinc oxide, titanium dioxide, magnesium oxide, calcium oxide, calcium carbonate, silicas, diatomaceous earth, carbon black, aluminum oxide, clays, glass and other fibers and similar materials as well as conventional stabilizers, dyes, curing agents, accelerators, foaming agents, catalysts, plasticizers, binders, flocculants, film formers, tackifiers, thickeners, dispersants, suspending agents, emulsifiers, cross-linking agents, accelerators and other such additives.

Our polymeric materials may, in addition, by applied and useful in the control of viscosity and stabilization of drilling muds and thickening cosmetic and pharmaceutical formulations, such as hand creams, lotions, creams, soaps and the like, and in hair sprays and hair treatment formulations, as well as in adhesive compositions, detergents and cleaning solutions, paint emulsions and acid plating baths. Our materials may be employed as binders, complexing agents, flocculants, film formers, tackifiers, thickeners, protective colloid agents such dispersants, emulsifiers, stabilizers and suspending agents in adhesives, cements, ceramic compositions, detergents, inks, latex paint, leather formulations, in ore benefaction processes, printing pastes, protective coatings, and in other fields and formulations.

SPECIFIC EMBODIMENTS

Example 1

(a) A 1-liter flask was charged with 242.3 grams (0.1 mole) of a nonylphenoxypolyethoxyethanol containing an average of 50 oxyethylene units, and heated to about 50° C. to melt the surfactant. 14.4 grams (0.2 mole) of glacial acrylic acid was added followed by 2.57 grams of p-toluenesulfonic acid catalyst and 0.05 gram of p-methoxyphenol inhibitor. The mixture was stirred, heated to 120° C. and held at this temperature for 2 hours to drive off the water formed during the esterification and to form a nonylphenoxypolyethoxyethyl acrylate monomer. The monomer is a surfactant ester containing from about 9 to 12 percent by weight of the acrylate ester, since the acid number of 45.9 initially went to about 35.0 on esterification rather than the theoretical value of 24.0 of full esterification. The ester reaction was carried out in contact with the air to inhibit side polymerization of the acrylic acid.

(b) A 2-liter flask equipped with stirrer, immersion thermometer and two dropping funnels was charged with 750 grams of deionized water, 150 grams of acrylic acid and 30 grams of the mixture from part (a). The contents of the flask were stirred and heated to 40° C. A solution of 1 gram of sodium persulfate in 50 grams of deionized water was added to one of the dropping funnels, and a solution of 1 gram of sodium metabisulfite in 50 grams of deionized water was added to the other funnel. 10 grams of the sodium persulfate solution was run into the flask followed by 10 grams of the sodium metabisulfite solution and 1 gram of a 1% ferrous sulfate solution in water. The dropwise addition of the solutions in the funnels was begun and scheduled to last for 1 hour. An exothermic polymerization reaction began immediately and caused the temperature of the batch to rise to about 75° C. The temperature was then maintained at this point for the remainder of the hour by applying external heating. The batch was then cooled to 50° C. and a solution of 83.33 grams of sodium hydroxide in 250 grams of water was added to adjust the pH to 7.0 to 7.5. The heat generated during the neutralization of the thickener caused the temperature to rise to about 65° C. The batch was stirred for 1 hour and allowed to cool to room temperature.

(c) A carpet backing compound was prepared by mixing under agitation 200 grams of a carboxylated styrene-butadiene synthetic rubber latex (GT 701 of General Tire and Rubber Co.) having a solids content of 50%, 92 grams of water and 350 grams of calcium carbonate whiting. The compound had a viscosity of 250 cps. at 4 r.p.m. when measured with a Brookfield RVF viscometer. The addition under agitation of 6 grams of the thickener from part (b) to the compound gave a viscosity of 55,250 cps. at 4 r.p.m. and 35,600 cps. at 10 r.p.m. A value for K was calculated to be 104,500 cps. and a flow index of −0.503 was obtained. The polymeric thickener imparted to the carboxylated styrene-butadiene latex an excellent combination of thickening efficiency and good thixotropy and flow properties. The value K is a measure of the thickening properties while the flow index defined as $n$ is a measure of the flow properties where $$\text{Viscosity} = K (\text{r.p.m.})^n$$

The flow properties of the thickened system were determined by determining the viscosity at different shear rates (r.p.m.) in the Brookfield viscometer and the values substituted in the above formula. Plotting of the logarithm values of viscosity versus r.p.m. results in straight line plots. The value of K is the antilog of the value of the intercept with the abscissa or extrapolated intercept. The value of $n$ is the slope of the log plot. Where $n=0$, the system is a Newtonian system, i.e., the viscosity is the same at all shear rates. If $n$ is greater than 0, it illustrates dilatancy, while increased values of $n$ (negative) less than 0 indicate increased thixotropy. Thickeners with poor flow properties have $n$ values of −0.7 to −1.0, while good flow properties are shown by $n$ values of −0.7 to 0. Viscosity values of K in cps. of 50 to 300,000, e.g., 50 to 150,000, represent typical viscosity values obtained with our polymeric thickeners in latex compositions.

Example 2

(a) The procedure of Example 1(a) was repeated using 462.5 grams (0.1 mole) of a nonylphenoxypolyethoxyethanol containing an average of 100 oxyethylene units, 14.4 grams (0.2 mole) of acrylic acid, 4.76 grams of p-toluenesulfonic acid and 0.10 gram of p-methoxyphenol.

(b) The procedure of Example 1(b) was then repeated using 750 grams of deionized water, 150 grams of acrylic acid and 15 grams of the mixture from part (a) of Example 2 in the flask. The polymerization and neutralization of the thickener was carried out as previously described.

(c) The addition of 6 grams of the thickener from part (b) of Example 2 to a carpet backing compound of the same composition as in Example 1(c) gave a viscosity of 55,000 cps. at 4 r.p.m. and 30,400 cps. at 10 r.p.m. The value for K was calculated to be 112,900 cps. and a flow index of −0.612 was obtained.

Example 3

(a) The procedure of Example 1(a) was repeated using 110.1 grams (0.1 mole) of a nonylphenoxypolyethoxyethanol containing an average of 20 oxyethylene units, 14.4 grams (0.2 mole) of acrylic acid, 1.24 grams of p-toluenesulfonic acid and 0.03 gram of p-methoxyphenol.

(b) The procedure of Example 1(b) was then repeated using 750 grams of deionized water, 150 grams of acrylic acid and 30 grams of the mixture from part (a) of Example 3 in the flask. The polymerization and neutralization was carried out as previously described.

(c) The addition of 6 grams of the thickener from Example 3(b) when added to a carpet backing compound of composition as in Example 1(c) caused the viscosity to increase to 22,800 cps. at 4 r.p.m. and 21,600 cps. at 10 r.p.m. K was calculated to be 57,700 cps. and a flow index of −0.676 was obtained.

Example 4

750 grams of deionized water and 150 grams of acrylic acid were charged to a polymerization flask. No other comonomer was used. Polymerization and neutralization were then carried out as described in Example 1(b) to prepare a thickener of a sodium polyacrylate. The addition of 6 grams of this thickener when added to a carpet backing compound of composition as in Example 1(c) raised the viscosity of the compound to 6,000 cps. at 4 r.p.m. and 2970 cps. at 10 r.p.m. K was calculated to be 17,640 cps. and the flow index obtained was −0.768.

Example 5

30 grams of the reaction product of acrylic acid with an octylphenoxypolyethoxyethanol containing an average of 70 oxyethylene units was copolymerized with 150 grams of acrylic acid and neutralized with sodium hydroxide as in Example 1(b) to prepare a thickener. 6 grams of this thickener added to the carpet backing compound of Example 1(c) raised the viscosity to 37,000 cps. at 4 r.p.m. and 20,000 at 10 r.p.m. K was calculated as 86,800 cps. and the flow index as −0.641.

Example 6

The procedure described in Example 5 was repeated using 60 grams of the reaction product of acrylic acid with an octylphenoxypolyethoxyethanol containing an average of 70 oxyethylene units. The surfactant partial ester when added to the carpet backing compound gave a viscosity of 52,500 cps. at 4 r.p.m. and 38,600 cps. at 10 r.p.m. The value for K was calculated to be 85,600 cps. and the flow index was —0.354.

Example 7

(a) A 1-liter flask is charged with 242.3 grams (0.1 mole) of a nonylphenoxypolyethoxyethanol containing an average of 50 oxyethylene units and heated to melt the surfactant and then 17.2 grams (0.2 mole) of methacrylic acid is added followed by 2.6 grams of p-toluene sulfuric acid and 0.052 gram of p-methoxyphenol. The mixture is heated to 120° C. under agitation and held at this temperature for two hours to remove the water formed during the reaction and to form the nonylphenoxypolyethoxy ethyl methacrylate monomer.

(b) A 2-liter flask equipped with a stirrer, immersion thermometer and three dropping funnels is charged with 741 grams of deionized water, 150 grams of acrylic acid and 12 grams of the mitxure from part (a). The contents of the flask are stirred and heated to 35–37° C. Ten cubic centimeters of a 1.96% aqueous sodium persulfate solution are run into the flask from one of the dropping funnels. Similarly, ten cubic centimeters of a 1.96% aqueous sodium metabisulfite were added to the flask via another suitably attached funnel. One cubic centimeter of a 1% aqueous ferrous sulfate soltuion was then added. The redox flows were started and regulated to last for one hour. The polymerization reaction began within 1–2 minutes exothermically and 72 grams of a 25% aqueous solution of part (a) were added in 4 equal portions (18 grams each) from a third dropping funnel at regular intervals of the reaction temperature rise; i.e., at 43.3° C., 48.9° C., 54.4° C. and 60° C. After the addition of the last aliquot, the temperature was allowed to climb exothermically to 70–75° C. After peaking, the temperature was held at 70–75° C. for the remainder of the hour by application of heat. The batch was then cooled to 50° C. and 333.3 grams of a 25% aqueous solution of sodium hydroxide were added under good agitation. The neutralization of the polyacid mixture was accompanied by a temperature rise of 15–20° C. The neutralized product was allowed to cool to room temperature.

(c) A carpet backing compound was prepared by mixing under agitation 200 grams of a synthetic butadiene-styrene rubber latex at 50% total solids content, 92 grams of water, and 350 grams of calcium carbonate whiting. Viscosity measurement of this compound with a Brookfield RVF 7 viscometer gave a value of 250 cps. at 4 r.p.m. The addition and blending of 6 grams of prepared thickener from part (b) to the compounded mix resulted in a viscosity of 103,750 cps. at 4 r.p.m. and 67,000 cps. at 10 r.p.m. The K value was calculated as 202,123 and the flow index as —0.495.

Example 8

(a) A 1-liter flask is charged with 242.3 grams (0.1 mole) of the same surfactant given in Example 7 part (a) and heated to 70° C. to melt the charge. After the addition of 13 grams of itaconic acid (0.1 mole), the procedure that is followed is the same as in Example 7 part (a) (nonylphenoxypolyethoxyethyl itaconate).

(b) Repeat the polymerization procedure given in Example 7 part (b) except use the surfactant intermediate in this Example part (a) followed by neutralization with sodium hydroxide solution.

(c) The mixing of 6 grams of thickener from Example 3 part (a) into the carpet-backing compound of Example 7 part (c) gave a Brookfield viscosity (RVF 7) of 48,750 at 4 r.p.m. and 32,500 at 10 r.p.m. The K value was 92,687 and a flow index of —0.475 was obtained.

When tested for thickening in various latex compositions, our thickener of Example 7 gave the following results:

Example 9

62% centrifuged natural rubber latex (ASTM—Type 1)
Original viscosity 100 cps.
Thickened with 1% 18,400 cps.

Example 10

Homopolymer of polyvinyl acetate latex (V501—General Latex and Chemical Corporation)—55% solids
Original viscosity 1000 cps.
Thickened with 1% 2900 cps. 4/10, 4250 cps. 4/4.
K value is 7310—$n$ is —0.363

Example 11

Carboxylic copolymer acrylic latex (A116—General Latex and Chemical Corporation)—50% solids
Original viscosity 150 cps.
Thickened with 1% 5200 cps. 4/10
K value is 35,260—$n$ is —0.826

Example 12

Homopolymer of polystyrene latex—42% solids
Original viscosity 150 cps.
Thickened with 1% 8700 cps. 4/10, 18,700 cps. 4/4
K is 50,520—$n$ is —0.829

(4/10 and 4/4 refers to the Brookfield viscometer spindle number and speed).

As illustrated by the foregoing examples and disclosures, our ester surfactants and polymeric thickeners may be easily employed in thickening a polymeric latex composition and in also imparting excellent flow properties to the thickened latex.

What we claim is:

1. A water-soluble polymer composition useful as a thickening agent in aqueous polymeric latices, which polymer composition consists essentially of a copolymer of an unsaturated monomeric ester of an alkylphenoxypoly $C_2$–$C_3$ alkyleneoxy $C_2$–$C_3$ alkanol containing from about 20 to 100 polyalkyleneoxy groups and a $C_2$–$C_6$ unsaturated carboxylic acid with a $C_2$–$C_6$ unsaturated carboxylic acid compound, the copolymer comprising from about 70 to 95% by weight of the ester and from about 5 to 30% by weight of the unsaturated carboxylic acid compound.

2. The composition of claim 1 wherein the number of polyalkyleneoxy groups ranges from about 50 to 100.

3. The composition of claim 1 wherein the unsaturated carboxylic acid compound is selected from the group consisting of acrylic acid, methacrylic acid, itaconic acid, fumaric acid, and maleic acid and the salts and combinations thereof.

4. The composition of claim 1 wherein the ester is an alkylphenoxypolyethoxyethyl acrylate.

5. The composition of claim 1 wherein the copolymer comprises from about 80 to 90% by weight of the unsaturated monomeric ester and from about 10 to 20% by weight of the unsaturated carboxylic acid compound.

6. The composition of claim 1 wherein the unsaturated carboxylic acid compound of the ester and the unsaturated carboxylic acid compounds are the same.

7. The composition of claim 1 wherein the polymer composition comprises the salt of a base selected from the group consisting of alkali and alkaline earth metal bases and ammonia.

8. A polymer composition useful as a thickening agent in aqueous polymeric latices, which polymer composition consists essentially of a compolymer of an unsaturated momomeric ester of a $C_8$–$C_{12}$ alkylphenoxypolyethoxyethanol containing from about 20 to 100 polyethoxy groups and a $C_2$–$C_6$ unsaturated carboxylic acid with a $C_2$–$C_6$ unsaturated carboxylic acid compound, the copolymer comprising from about 80 to 90% by weight of the ester and from about 10 to 20% by weight of the unsaturated carboxylic compound, the unsaturated carboxylic acid compound selected from the group consisting of acrylic acid, metacrylic acid, itaconic acid, fumaric acid, and maleic acid and the salts and combinations thereof.

9. A method of preparing a polymeric composition useful as a thickener, which method consists essentially of:
(a) esterifying an alkylphenoxy $C_2$–$C_3$ polyalkyleneoxyalkanol with an unsaturated carboxylic acid to provide an unsaturated ester; and
(b) copolymerizing the unsaturated ester with an unsaturated carboxylic acid, the polymer so prepared comprising from about 70 to 95% by weight of the ester and from about 5 to 30% by weight of the unsaturated carboxylic acid compound with the ester containing from about 20 to 100 $C_2$–$C_3$ polyalkylenoxy groups.

10. The method of claim 9 which includes reacting the pendant acid groups of the copolymer with a water-soluble base.

11. The method of claim 9 which includes neutralizing the pendant acid groups of the copolymer to a pH of approximately 6 to 7.5 with a water-soluble basic compound selected from the group consisting of alkali and alkaline earth metal bases and ammonia.

12. The method of claim 9 wherein the alkylphenoxy compound is an alkylphenoxypolyethoxyethanol.

13. The method of claim 9 wherein the unsaturated acid compound is selected from the group consisting of acrylic acid, methacrylic acid, itaconic acid, maleic acid and fumaric acid and the acid salts and combinations thereof.

14. The method of claim 9 wherein the number of alkyleneoxy groups ranges from about 50 to 100 and the alkyl group is a $C_8$–$C_9$ alkyl radical.

15. The method of claim 9 wherein the copolymer comprises from about 80 to 90% of the ester and from about 10 to 20% of the unsaturated carboxylic acid compound.

16. The method of claim 9 which includes reacting the pendant acid groups with a copolymer with a water-soluble alcohol or amine.

17. The method of claim 9 which includes incorporating about 20 to 60 percent by weight of the ester into a water solution of the unsaturated carboxylic acid; inducing copolymerization of the ester and acid by adding a redox copolymerization catalyst; and incorporating the remaining portion of the ester by incremental additions into the reaction mixture during the copolymerization reaction exotherm.

18. A method of preparing a polymeric composition useful as a thickener which method consists essentially of: copolymerizing an alkylphenoxypolyethoxyethyl acrylate in the presence of a redox catalyst with an unsaturated carboxylic acid selected from the group consisting of acrylic acid, methacrylic acid, itaconic acid, maleic acid, and fumaric acid, the ester containing from about 20 to 100 polyethoxy groups, and the copolymer comprising from about 70 to 95% of the ester and 5 to 30% of the acid, and wherein from about 20 to 60 percent by weight of the ester is incorporated into a water solution of the unsaturated acid, and the remaining ester added in incremental additions to the reaction mixture during the copolymerization exothermic rise of from about 40 to 80° C.

References Cited

UNITED STATES PATENTS

| | | | |
|---|---|---|---|
| 3,052,648 | 9/1962 | Bauer | 260—885 |
| 3,106,482 | 10/1963 | Van Dijk et al. | 260—885 |
| 3,492,254 | 1/1970 | Strand et al. | 260—874 |
| 2,892,793 | 6/1959 | Stewart et al. | 260—874 |
| 3,341,627 | 9/1967 | Wilkinson | 260—470 |
| 3,317,483 | 5/1967 | Verdol | 260—885 |
| 3,387,061 | 6/1968 | Smith et al. | 260—874 |

JOHN C. BLEUTGE, Primary Examiner

U.S. Cl. X.R.

260—4 R, 29.6 RW, 29.7 W, 874, 885, 898, 899, 901, 78.5 E, 86.1 R